United States Patent Office 3,799,916
Patented Mar. 26, 1974

3,799,916
VINYL CHLORIDE BASED POLYMERS PREPARED BY IN-SITU INITIATORS IN ACID MEDIUM
Michael Langsam, Allentown, Pa., assignor to Air Products and Chemicals, Inc., Allentown, Pa.
No Drawing. Filed June 19, 1972, Ser. No. 264,044
Int. Cl. C08f 3/30, 15/06, 15/30
U.S. Cl. 260—87.1                                    10 Claims

ABSTRACT OF THE DISCLOSURE

Granular vinyl chloride based polymers are manufactured in the presence of a peroxydicarbonate free-radical catalyst, which is prepared in-situ in an acid reaction mixture. By initiating and maintaining polymerization at a pH constantly maintained below 7 the need for excess haloformate may be avoided without sacrificing product quality.

BACKGROUND OF THE INVENTION

The invention relates to a process for preparing commercially desirable vinyl chloride based polymers, such as vinyl chloride homopolymers (PVC) and copolymers containing vinyl chloride and other comonomers, wherein a peroxydicarbonate free-radical initiator is formed in-situ while the reaction mixture is maintained at a pH below 7. The peroxydicarbonates prepared in the polymerization process may be identified by the formula:

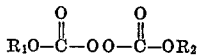

wherein $R_1$ and $R_2$ are alkyl or alkenyl radicals.

By constantly maintaining the pH of the reaction mixture in the acidic range from the time polymerization commences the ratio of organic haloformate to aqueous soluble peroxide needed to prepare the catalyst can be varied considerably without adversely affecting quality of the resulting polymer.

Polymerization of vinyl based monomers, such as vinyl chloride may be accomplished by means of a free-radical polymerization initiator in a suspension, emulsion or bulk polymerization system. Polymerization, itself, is initiated by the generation of free-radicals arising from the decomposition of various organic peroxides, such as benzoyl peroxide, lauroyl peroxide and the like. Peroxydicarbonate type free-radical catalysts, as with other organic peroxy catalysts, if not given special handling by storing at sufficiently low temperatures or if not metered into the reactor under carefully controlled conditions, can result in an uncontrollable rate of reaction endangering both operators and equipment as well as adversely affecting the final product.

Because peroxydicarbonate free-radical initiators standout as a particularly preferred group of polymerization catalysts, one approach taken in correcting the foregoing problems was to produce such initiators in-situ rather than by adding the pre-manufactured catalyst to the reactor. This process is described in U.S. Pat. 3,002,281, which provides for conducting the process in an alkaline medium above a pH 7 for binding the hydrogen halide liberated from the reaction of the peroxide and an alkyl haloformate. The basic medium is maintained by use of an alkaline buffering agent suitable for producing and sustaining the pH above 7. This proces further provides for a sufficient amount of hydrogen peroxide to react with the alkyl haloformate present, which necessitates using at least a stoichiometrically equivalent amount of hydrogen peroxide amounting to not less than 1 mole of hydrogen peroxide for each two moles of alkyl haloformate.

Although the process described in U.S. 3,022,281 did provide a solution to the problems of special storage and uncontrolled reaction rate, by eliminating the use of pre-manufactured peroxydicarbonates, other difficulties arose making the process less than satisfactory. It was found that polymers manufactured accordingly were not in the desired granular form, but instead were of a fibrous consistency. Furthermore, it was discovered that other commercially important resins, such as vinyl chloride-vinyl acetate copolymers could not be successfully prepared in commercially acceptable quality, apparently due to alkaline hydrolysis.

Another approach to the problem is described in U.S. Pat. 3,575,945, which suggests using a stoichiometric excess of alkyl haloformate over hydrogen peroxide in order to ensure preparation of the more commercially desirable polymer granules. Here, as with the earlier described process, the initial pH of the aqueous phase of the reaction mixture is always above 7. However, this more recent process, though specifying an initial pH of 8.5 to 11.7, gradually drifts to a pH below 7 as polymerization proceeds, due to the generation of hydrogen halide and the absence of an alkaline buffering agent. In spite of generally improved product quality, this later process (U.S. 3,575,945) lacked desired flexibility, in terms of proportional ranges of reactants needed for in-situ preparation of the peroxydicarbonate initiator. Here, as with the earlier in-situ process, certain vinyl chloride based copolymers could not be readily prepared with acceptable quality.

British Pat. 1,262,706, as in the case of the later U.S. patent, also provides for a process of manufacturing vinyl chloride polymers by in-situ mechanism using peroxydicarbonate free-radical catalysts. Polymerization is also initiated in alkaline medium and subsequently falls to an acid pH as the reaction progresses.

It has now been discovered that high quality granular vinyl chloride based polymers can be prepared by means which entail conducting polymerization at an initial pH below 7 and maintaining it in the acid range throughout the cycle. Furthermore, a broad, flexible range of reactants can be successfully employed for the in situ manufacture of the cataylst without adversely affecting polymer quality. The vinyl chloride based polymers are prepared by manufacturing peroxydicarbonate free-radical catalysts in the presence of at least one monomer, said catalyst having the formula:

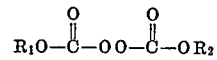

wherein $R_1$ and $R_2$ are alkyl or alkenyl groups having from 1 to 7 carbon atoms.

Accordingly, it is a principal object of the present invention to provide a process for manufacturing high quality granular vinyl chloride based polymers wherein the polymerization initiator is prepared in-situ in a reaction mixture constantly maintained at a pH below 7.

It is a further object of the instant invention to provide a flexible process allowing wide variation of proportional amounts of reactants for preparing in-situ peroxydicarbonate free-radical catalysts for polymerizing vinyl chloride based monomers, without adversely affecting product quality.

A still further object is to provide a process for manufacturing vinyl chloride based copolymers by employing a peroxydicarbonate free-radical catalyst, which catalyst, itself, can be prepared in the reaction mixture.

These and other objects, features and advantages of this invention will become apparent to those skilled in the art after a reading of the following more detailed description.

PREFERRED EMBODIMENTS OF THE INVENTION

Broadly, the invention is directed to a process for preparing vinyl chloride based polymers with a dialkyl or dialkenyl peroxydicarbonate free-radical initiator, which is prepared in-situ during polymerization of the monomers. The process is adaptable to polymerization systems having a water phase and a monomer phase in which each of the reactants required for preparing the catalyst is soluble in one of the two mentioned phases.

In carrying out the process, the peroxydicarbonate catalyst is formed during the polymerization of one or more monomers by reacting a water soluble peroxide with an alkyl or alkenyl haloformate. The peroxide reactant is soluble in the water phase and the haloformate is soluble in the monomer phase. Included in the reaction mixture, before polymerization commences, is an acidifier which maintains the aqueous phase of the mixture at a pH below 7. The pH of the mixture remains acidic throughout the reaction cycle. Because hydrogen halide is generated during the formation of the catalyst, additional acidifier is not needed to maintain the pH constantly below 7. However, most conveniently, an acid buffering agent can be employed.

The peroxydicarbonate initiator decomposes after being formed in the presence of the monomers, thus providing the necessary free-radicals to bring about polymerization of the monomers. The reaction commences by elevating the mixture to above ambient temperatures.

As previously indictaed, the instant process finds widespread use in polymerization systems containing both water and oil or monomer phases wherein vinyl based monomers are polymerized in the presence of a free-radical catalyst, and more particularly, a peroxydicarbonate free-radical catalyst. However, the method of the present invention is specially applicable to the manufacture of vinyl chloride based polymers, which for purposes of this invention, denote both homopolymers and copolymers, such as polyvinyl chloride (PVC), polyvinylidene chloride and copolymers containing vinyl chloride and other comonomers like vinyl acetate, acrylate and methacrylate esters. The acrylates include, for example, methyl, ethyl, butyl or 2-ethylhexyl and the methacrylates include, for example, methyl, ethyl, butyl, lauryl and stearyl. Included along therewith are copolymers of vinyl chloride and various olefins, and particularly, those comprising vinyl chloride and propylene, such as the solid resins disclosed in U.S. Pat. 3,468,858. Copolymers disclosed therein are characterized as having from about 90 to 99% vinyl chloride and a propylene content of 1 to 10%, preferably 2 to 8% by weight, an intrinsic viscosity of 0.5 to 1.5 dl./g. and a melt flow rate of at least 0.1 dg./min.

Although the disclosed process is particularly adaptable to the preparation of the foregoing vinyl chloride based polymers, other vinyl based homo- and copolymers may also be manufactured accordingly. They include polymers of other vinyl halides, alcohols, esters and ethers, such as vinyl fluoride, vinyl alcohol, vinyl acetal, vinyl butyral, vinyl formal, vinyl laurate, vinyl myristal ether, vinyl lauryl ether and the like.

The peroxydicarbonates generated in the reaction mixture (in-situ) for initiating polymerization of the above mentioned monomers are prepared by the reaction of a water soluble peroxide with an alkyl or alkenyl haloformate. The aqueous soluble peroxide may be, for example, hydrogen peroxide, alkali metal peroxides like sodium and potassium or acid peroxides e.g. . . . peracetic acid, performic acid, etc. The requirements in selecting an appropriate peroxide are not critical, however, they must, nevertheless, be miscible with the aqueous phase of the polymerization system.

The haloformates may be represented by the formula:

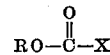

wherein R is alkyl or alkenyl and X is halogen, such as fluorine, chlorine, bromine or iodine. Alkyl and alkenyl, in most instances, refer to radicals having from 1 to about 7 carbon atoms, which may be both branched and straight chained groups, like methyl, ethyl, propyl, isopropyl, n-butyl, t-butyl, pentyl, hexyl, allyl, propenyl and the like. However, higher radicals such as nonyl and lauryl are also included in this group.

The following table illustrates but a few of the haloformates falling within the purview of the above formula:

TABLE I

| R: | X |
|---|---|
| $CH_3-$ | Cl |
| $C_2H_5-$ | Cl |
| $CH_3-$ | I |
| $i-C_3H_7-$ | Br |
| $t-C_4H_9-$ | Cl |
| $C_6H_{13}-$ | Cl |
| $C_2H_3-$ | Cl |
| $C_2H_5-$ | F |
| $C_3H_5-$ | Cl |
| $C_{10}H_{21}-$ | Cl |

In-situ preparation of the peroxydicarbonate catalysts may be accomplished by incorporating the peroxide reactant into the aqueous phase of the reaction mixture and the particular haloformate into the oil or monomer phase of the polymerization system. The ratio of haloformate to peroxide in the reaction mixture may be in a range from about 10:1 to about 1:10, respectively. However, to ensure the formation of a high quality, granular product using the above flexible ratio of reactants, the pH of the aqueous phase must be adjusted so the reaction mixture has an initial pH below 7. The pH should be constantly maintained on the acidic side throughout the polymerization cycle, and, preferably, in the range from about 4.5 to 6.9. Lower initial pH's can also be used, however, no special or added benefits are seen by starting the cycle at pH below about 4. However, it is not uncommon for the pH at the completion of the cycle to be as low as 2 to 3. Acidification of the reaction mixture can be easily accomplished by use of virtually any acidifier, such as the commonly available inorganic acids like dilute solutions of hydrochloric acid or mixed phosphoric acid salts. As the in-situ reaction progresses, hydrogen halide is generated which, in most instances, will preclude the need for additional acidifier.

The initial pH of the reaction mixture can also be lowered to below 7 and conveniently maintained at a controlled acid pH range by employing any acid buffering agent. Mono- and dibasic sodium phosphates, McIlvanie's Standard Buffer solutions of citric acid and disodium phosphate, or any other acid buffering composition may be used including those commonly prepared from a weak acid and a salt of that acid. The acidifier, whether in the form of an inorganic acid or acid buffering agent, is ordinarily added to the aqueous phase in an amount sufficient to provide the system with an initial pH of below 7.

It is believed the constant acid pH maintained throughout the cycle allows for electrophilic substitution wherein the acid functions to promote formation of the required electrophile as shown below:

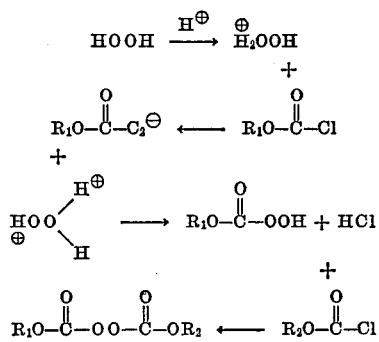

On the other hand, when the reaction is initiated with an alkaline aqueous phase, nucleophilic displacement occurs rather than electrophilic substitution.

Representative examples of peroxydicarbonate free-radical catalysts prepared in-situ corresponding to the formula of the above final product are shown in the table below.

TABLE II

| $R_1$: | $R_2$ |
|---|---|
| i—$C_3H_7$— | i—$C_3H_7$— |
| $C_2H_3$— | $C_2H_5$— |
| t-$C_4H_9$— | $C_2H_3$— |
| $C_2H_5$— | t-$C_4H_9$— |
| $C_{10}H_{21}$— | $C_{10}H_{21}$— |

When the dialkyl or dialkenyl peroxydicarbonate is prepared in-situ with an aqueous phase constantly maintained at a pH below 7, it is generally desirable to employ from about 0.0001 to about 0.01 parts of the alkyl or alkenyl haloformate per 100 parts monomer. To actuate formation of the catalyst in the presence of the monomers and to bring about polymerization the temperature of the reaction mixture is elevated to somewhat above ambient conditions. However, a more efficient rate of conversion is achieved with temperatures ranging from about 35° C. to about 65° C.

In preparing granular resins according to the present invention, protective colloids may be optionally included in the aqueous phase. Any colloidal forming material can be employed which would be consistant with standard practices in suspension polymerization systems. Especially preferred members would be the cellulosic compounds like hydroxymethyl or hydroxyethyl cellulose. Various surfactants may also be used, such as Aerosol-OT (dioctyl sodium sulfosuccinate) as well as other non-ionic materials. These agents, when used, are added in an amount from about 0.01 to about 1% by weight.

The following examples illustrate some of the embodiments of this invention. It is to be understood, however, that these are for illustrative purposes only, and do not purport to be wholly definitive as to conditions and scope.

EXAMPLE I

A conventional tumbled water bath was charged with the following:

| | | |
|---|---|---|
| Water | gm | 200.00 |
| $NaH_2PO_4$ | gm | 0.33 |
| $Na_2HPO_4$ | gm | 0.27 |
| Hydrogen peroxide | gm | 0.165 |
| Vinyl chloride | gm | 100.00 |
| Ethyl chloroformate | ml | 0.454 |

The water, buffer and hydrogen peroxide were first introduced into the vessel which provided the aqueous phase with an initial pH of 6.60. The vessel was then flushed with nitrogen to displace the atmospheric oxygen. Vinyl chloride was then charged into the reactor followed by the ethyl chloroformate which was soluble in the monomer. All suspending agents were omitted from the charge. The vessel was capped and warmed to 50° C. and tumbled for 4 hours. The conversion suspension polymerization at the end of this period was 59% and the final pH of the aqueous phase was 2.3. The PVC was a high quality, granular product prepared with a mole ratio of ethyl chloroformate to $H_2O_2$ of 1:1.

EXAMPLE II

A tumbler was charged with the following ingredients:

| | | |
|---|---|---|
| Distilled water | gm | 200.00 |
| Methocel HG65 (hydroxymethylcellulose) | gm | 0.072 |
| $H_2O_2$ | gm | 0.165 |
| $NaH_2PO_4$ | gm | 0.33 |
| $Na_2HPO_4$ | gm | 0.27 |
| Vinyl chloride | gm | 100.00 |
| Ethyl chloroformate | ml | 0.454 |

The above composition was prepared according to the method of Example I, however, the hydroxymethylcellulose protective colloid was dissolved in the aqueous phase. The initial pH was 6.60 and at the end of 4 hours the conversion was 52.1% and the final pH was 3.4.

EXAMPLE III

| | | |
|---|---|---|
| Distilled water | gm | 200.00 |
| Hydroxymethylcellulose | gm | 0.18 |
| Aerosol OT (dioctyl sodium sulfosuccinate) | gm | 0.016 |
| $NaH_2PO_4$ | gm | 0.33 |
| $Na_2HPO_4$ | gm | 0.27 |
| Peracetic acid | gm | 0.365 |
| Vinyl chloride | gm | 100.00 |
| Ethyl chloroformate | ml | 0.454 |

The above formulation was used in preparing high quality, granular PVC. The initial pH was 6.60 and after 5 hours the conversion was 88% and the aqueous phase had a final pH of 2.3.

EXAMPLE IV (A) The following ingredients were used to prepare a vinyl chloride-vinyl acetate copolymer.

| | | |
|---|---|---|
| Distilled water | gm | 200.00 |
| Methocel HG65 | gm | 0.18 |
| Aerosol OT | gm | 0.016 |
| $Na_2HPO_4$ | gm | 0.03 |
| $NaH_2PO_4$ | gm | 0.03 |
| $H_2O_2$ | gm | 0.165 |
| Vinyl chloride | gm | 85.0 |
| Vinyl acetate | gm | 15.0 |
| Ethyl chloroformate | ml | 0.454 |

In preparing the reaction mixture according to the method of Example I the aqueous phase had a pH of 6.65. Polymerization occurred over a period of 24 hours providing a yield of 92.1% and a final pH of 2.5. The copolymer by visual appearance was a high grade, commercially acceptable product.

(B) For purposes of comparison, the same in-situ reaction was conducted with the above formulation. In this run, an alkaline sodium bicarbonate buffer was used in place of the acid phosphate buffer of part A. The initial pH of the aqueous phase was greater than 7. After a period of 24 hours the conversion was 99% and the final pH was still greater than 7. The copolymer formed in the alkaline medium was in the nature of a globular or lumpy mass, which was unsatisfactory for commercial use.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

I claim:
1. A process for preparing vinyl chloride based polymers in an aqueous system which comprises forming a peroxydicarbonate free-radical catalyst in-situ during polymerization, said catalyst having the formula:

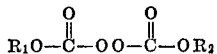

wherein $R_1$ and $R_2$ are alkyl or alkenyl radicals, the catalyst being prepared from a water soluble peroxide and an organic haloformate in a ratio ranging from about 10:1 to about 1:10, the haloformate having the formula:

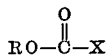

wherein R is the same as $R_1$ and $R_2$ and X is halogen, the polymerization reaction being initiated and conducted at a pH constantly maintained below 7.

2. The process of claim 1 wherein the vinyl chloride based polymer is polyvinyl chloride.
3. The process of claim 1 wherein the vinyl chloride polymer is vinyl chloride-vinyl acetate copolymer.
4. The process of claim 1 wherein the vinyl chloride polymer is a vinyl chloride-propylene copolymer.
5. The process of claim 1 wherein the water soluble peroxide is hydrogen peroxide, sodium peroxide, potassium peroxide, peracetic acid or performic acid.
6. The process of claim 1 including in the reaction mixture an acid buffering agent in an amount sufficient to maintain the pH below 7.
7. The process of claim 1 wherein the haloformate is a $C_1$ to $C_7$ alkyl chloroformate.
8. The process of claim 7 wherein the reaction is conducted at an initial pH of 4.5 to 6.9.
9. The process of claim 7 wherein the haloformate is isopropyl chloroformate.
10. The process of claim 7 wherein the haloformate is methyl or ethyl chloroformate.

References Cited
UNITED STATES PATENTS

| | | | |
|---|---|---|---|
| 3,022,281 | 2/1962 | Smith | 260—Dig. 28 |
| 3,108,093 | 10/1963 | Pajaczkowski et al. | 260—92.8 R |
| 3,575,945 | 4/1971 | Cantoni et al. | 260—92.8 W |

HARRY WONG, JR., Primary Examiner

U.S. Cl. X.R.

260—67 UA, 86.3, 87.5 C, 89.1, 91.1 M, 92.1 R, 92.8 W

UNITED STATES PATENT OFFICE
CERTIFICATE OF CORRECTION

Patent No. 3,799,916  Dated March 26, 1974

Inventor(s) Michael Langsam

It is certified that error appears in the above-identified patent and that said Letters Patent are hereby corrected as shown below:

Column 1, line 14, "acid" should read --acidic--.

Column 5, line 3, "$R_1O-\overset{O}{\underset{\|}{C}}-C_2{}^{\ominus}$" should read --$R_1O-\overset{O}{\underset{\|}{C}}-Cl{}^{\ominus}$--

Column 5, Table II left hand column, line 27 "$C_2H_3-$" should read --$C_2H_5-$--;

line 28 "$t-C_4H_9-$" should read --$C_2H_3-$--;

line 29 "$C_2H_5-$" should read --$t-C_4H_9-$--.

Column 6, line 3, "conversion suspension" should read --conversion by suspension--.

Signed and sealed this 3rd day of December 1974.

(SEAL)
Attest:

McCOY M. GIBSON JR.
Attesting Officer

C. MARSHALL DANN
Commissioner of Patents